Nov. 8, 1949          H. O. RICCI          2,487,591
WARNING LIGHT FOR EMERGENCY VEHICLES
Filed March 11, 1946          2 Sheets-Sheet 1
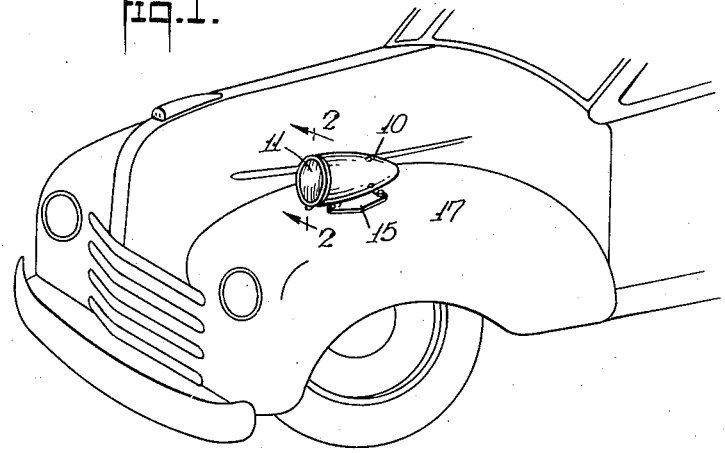
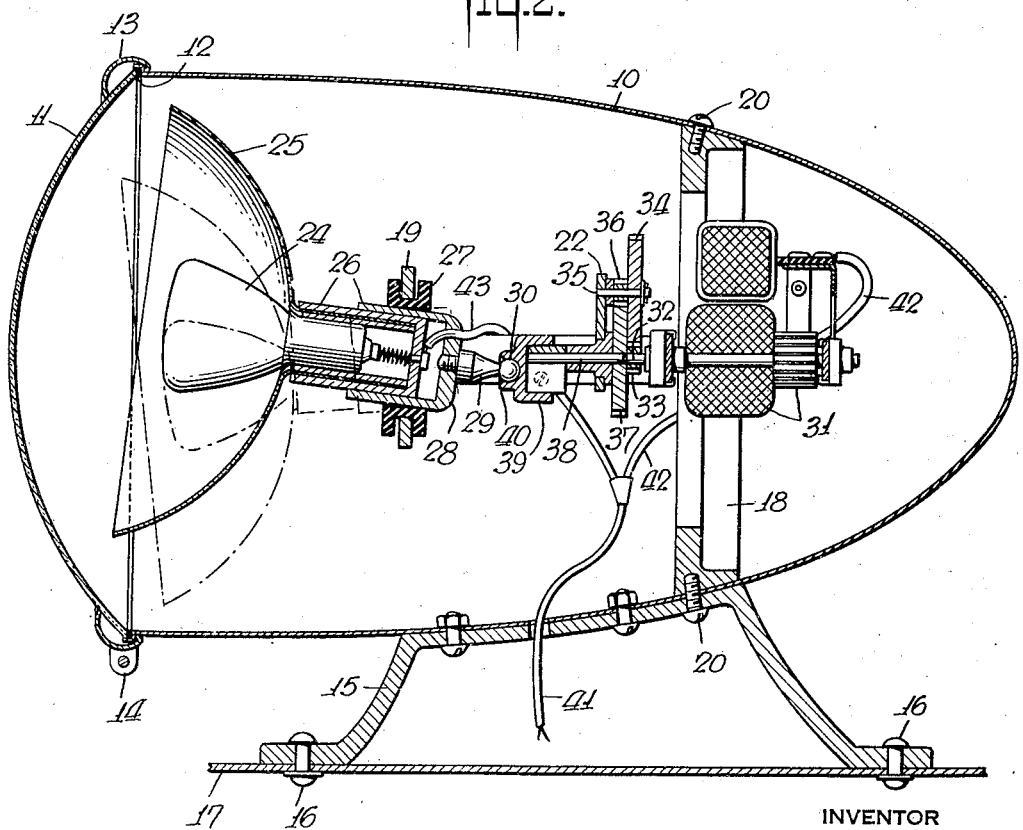
INVENTOR
*Harry O. Ricci*
BY
*Frederick Breitenfeld*
ATTORNEY Nov. 8, 1949 H. O. RICCI 2,487,591
WARNING LIGHT FOR EMERGENCY VEHICLES
Filed March 11, 1946 2 Sheets-Sheet 2

INVENTOR
Harry O. Ricci
BY
Frederick Greitenfeld
ATTORNEY

Patented Nov. 8, 1949

2,487,591

UNITED STATES PATENT OFFICE 2,487,591

WARNING LIGHT FOR EMERGENCY VEHICLES

Harry O. Ricci, Dongan Hills, N. Y.

Application March 11, 1946, Serial No. 653,510

4 Claims. (Cl. 74—86)

My present invention relates generally to electric signaling devices, and has particular reference to a warning light intended primarily for use on police cars, fire engines, ambulances and similar emergency vehicles.

A general object of the invention is to provide an improved type of device which will project a moving beam of light in such a way that a unique attention-arresting effect is produced. The present light, when viewed from in front and at a distance, as for example by an approaching vehicle, creates the illusion of a single stationary light source having a second light source rotating around it, whereas the device comprises in actuality only a single light source mounted in conventional fashion within a forwardly-facing reflector.

It is contemplated that the present warning light will be of particular usefulness on the front of a vehicle, to impart a conspicuous visual warning to those who may be directly or approximately in the path of the vehicle. Obviously, however, the light in not necessarily restricted to such a specific purpose, and may also be used at a point which is permanently or temporarily stationary, e. g., at a traffic intersection or at the scene of a fire or accident, to give a similar warning to approaching vehicles.

It is of course desirable that any warning light of the character mentioned should be continuously visible from as great a distance as possible, and should be clearly recognizable as a signal of special significance, as distinguished from an ordinary traffic light or the like. Many of the lights which have heretofore been devised for this general purpose have fallen short of successfully achieving this object. For example, a light which merely goes on and off is not sufficiently conspicuous to be distinguished from an ordinary intersection signal; and one that merely swings back and forth through a horizontal or vertical arc is little better, since it vanishes completely at the ends of its swinging movements and thus creates the simple illusion of a light which is alternately turned on and off.

It is a feature of the present invention to employ the effect produced by moving a light source, including its usual lamp reflector, in such a way that the axis of the projected beam traverses a conical path, and it is a more particular feature of the invention to accomplish this result by means of a mechanism which is constructed as a unit for bodily securement as a single entity within a wholly rigid and stationary housing. Thus, the structure as a whole and its mode of mounting on a vehicle or the like is greatly simplified, the device is unusually staunch and rugged, and the operative mechanism is at all times thoroughly shielded and protected from the vicissitudes of the weather, whereby its performance is always trustworthy and reliable.

A more particular object of the invention is to provide a construction which is of marked simplicity, both from manufacturing and operating standpoints, and which is so designed that there are not only a minimum number of parts, but also a minimum degree of movement of the parts involved. This not only reduces the motive power required, but also obviates lubrication problems, and minimizes wear and tear.

These desirable advantages arise, in part, from a special design in which the lamp reflector is provided with a central rearwardly-directed stem, and in which the pivotal support is established at the stem, and at a point forwardly of its rear end, the support being yieldable to an extent sufficient to permit a bodily conical twisting movement of the reflector and stem around an apex in the plane of said support. The simplicity of the mechanism is further attributable to the provision of a drive shaft mounted with its axis coincident with the axis of said conical twisting, whereby a simple eccentric articulation between this shaft and the rear end of said stem, sufficient to move the latter only through a small circular arc, will result in imparting a magnified movement of the type desired, to the light beam itself.

As hereinbefore stated, the mechanism is of unitary character, and the manufacture and assembly of the housing and of the unit which is secured within it are thereby of simple and relatively inexpensive character.

A preferred way of achieving these general objects and advantages, and such other objects and advantages as may hereinafter appear or be pointed out, is illustratively exemplified in the accompanying drawings, in which:

Figure 1 is a perspective view of the forward end of a vehicle showing a warning light of the present character associated therewith;

Figure 2 is a longitudinal cross-sectional view through a device of the present character;

Figure 3:
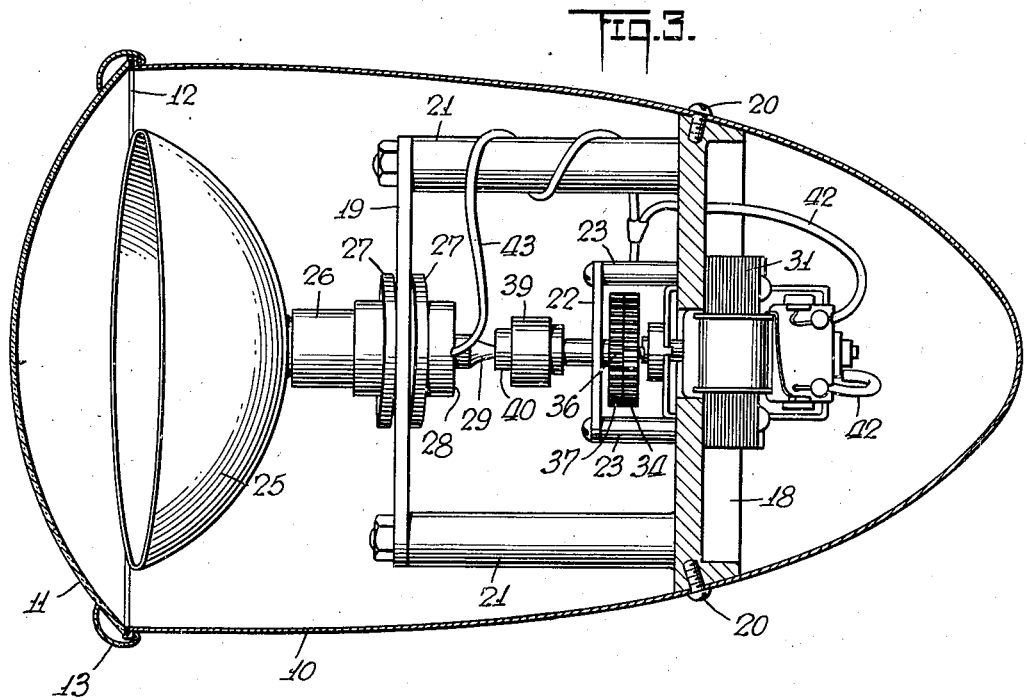
Figure 3 is a cross-sectional plan view.
Figure 4:
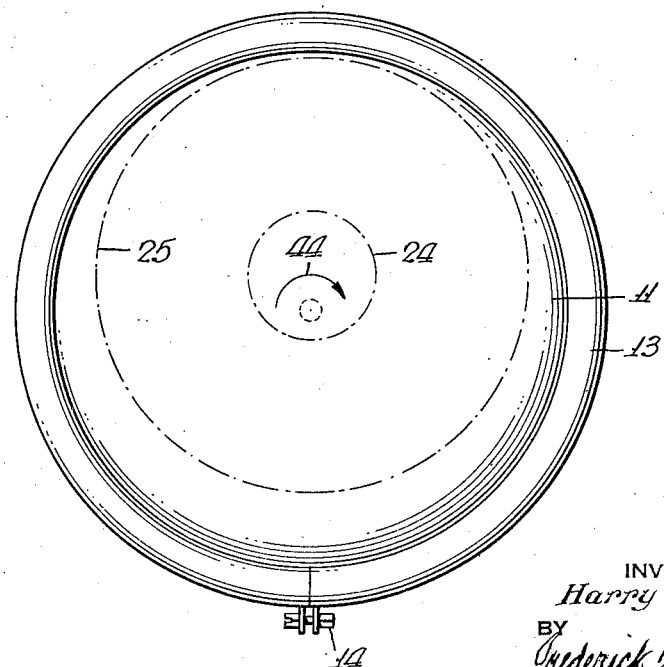
Figure 4 is a front view of the device with the supporting base omitted.

The construction is characterized by the employment of a wholly rigid and permanently sealed housing having a body portion 10 of substantially circular cross-section and of a size which gradually diminishes toward the rear to provide a rounded rear end as shown. This body portion is preferably composed of suitable metal. At its front end, the housing is provided with a lens or glass pane 11, preferably of red coloration. The lens 11 is rigidly mounted in association with the housing body 10, and the preferred construction involves a gasket 12 of rubber or the like, and a clamping ring 13, the latter being of split construction and being held in position by means of a nut and bolt association 14 (Figure 4).

On its under side, the housing body 10 may be provided with a base 15 by means of which it may be rigidly secured, as indicated at 16, to the vehicle body 17 or any other desired support.

The unitary mechanism within the housing is supported by a rigid frame which consists, essentially, of a rear portion 18 and a spaced forward portion 19. The entire interior mechanism is secured to the housing body 10 only at the rear portion 18, the latter having a ring-like shape which permits it to fit snugly within the rear end of the body 10, and studs 20 extending through the wall of the housing into threaded holes in the frame portion 18.

The forward portion 19 of the frame is a flat bar-like element having a medial aperture, this element being preferably secured to the forward ends of posts 21 projecting forwardly from the rear frame portion 18.

For a purpose presently to be described, the frame also includes a bar-like portion 22, supported on posts 23.

The light source has been shown in the form of an electric light bulb 24, and this bulb may be of any conventional or desired character, being fitted into a suitable socket. Projecting forwardly from the socket is a forwardly facing reflector 25 adapted to concentrate the light from the bulb 24 in a generally forward direction. The reflector 25 is provided with a central rearwardly-extending stem 26 which may be of any suitable character and within which the lamp socket is mounted. This stem extends through the medial aperture in the frame portion 19, as shown most clearly in Figure 2, and is engaged by the yieldable ring-like element 27 which fits into this aperture and which may be composed of rubber or the like. The engagement thus established between the yieldable element 27 and the stem 26 permits the reflector 25 and the stem 26 to partake of a bodily conical twisting movement, as indicated by the dot-and-dash lines of Figure 2, the apex of the cone lying within the plane of the yieldable pivotal support.

It is to be noted that this support is established forwardly of the rear end 28 of the stem 26. For a purpose presently to be described, this rear end is provided with a rearward projection 29 on which there is a ball shaped end 30.

The remainder of the mechanism consists of a motive means for engaging the ball 30 and moving it through a circular arc transverse with respect to the axis of the reflector. This brings about the desired conical twisting movement of the reflector.

The motive power comprises an electric motor 31 which is carried by the rear frame portion 18 and which may be of any suitable or desired character. In the preferred arrangement of the parts, the shaft 32 of this motor is in substantial alignment with the axis of the housing, and carries a pinion 33. This pinion meshes with a relatively large gear wheel 34 mounted upon a shaft 35 which is journaled in the frame portion 22. On this shaft there is also mounted a small pinion 36 which meshes with the relatively large gear wheel 37. The latter is mounted on a drive shaft 38 which is also journaled in the frame portion 22. Regardless of how the electric motor may be mounted, it is a feature of the invention that the drive shaft 38 lie with its axis coincident with the axis of the conical twisting hereinbefore referred to.

In accordance with my invention an eccentric articulation is established between the drive shaft 38 and the ball 30; and I have illustratively shown an actuator 39 carried by and rigidly secured by the shaft 38 and provided with a socket 40 within which the ball 30 is mounted. The actuator 39 is so constructed that the socket 40 lies with its center eccentric with respect to the shaft 38. Accordingly, when the shaft 38 rotates, the ball 30 and the socket 40 establish a universal-joint articulation which moves the ball 30 through a small circular arc. Because of the disposition of the yieldable support 27 with respect to the rear end 28 of the stem 26, and to the reflector 25, the small circular movement imparted to the ball 30 becomes a circular movement of magnified character at the front edge of the reflector 25.

Suitable electric lead-in wires 41 are caused to pass into the housing, as indicated, one set 42 extending in suitable fashion to the motor 31, another set 43 extending forwardly to the lamp socket. The details of the electrical connections have not been illustrated, since these are well known to those skilled in the art. Any suitable source of current, such as the storage battery of the vehicle, may be employed for energizing the motor 31 as well as the lamp 24, and any suitable switch on the dash board of the vehicle, or elsewhere, may be employed for establishing the necessary circuit whenever the warning light is to be used.

As will be understood from the description given, an energization of the motor 31 brings about a rotation of the shaft 38, the speed of rotation being reduced by the reducing gears 32—37. The actuator 39 is secured to and rotates with the shaft 38, and thus imparts a corresponding circular movement to the rear end of the stem of the reflector. This causes a rotative movement of the bulb 24 and of the reflector 25, as indicated by the arrow 44 in Figure 4.

Strangely enough, the illusion created by the device, when viewed from a point in the path of the light beam, and at a distance, is that of a single central source of light and a satellite rotating around it. At no time is there any apparent extinguishment of the light, as in the case of ordinary swinging movements. Thus, the present warning light is not only conspicuously visible, but the effect which it produces is of a unique and attention-arresting character.

It will be observed that the number of moving parts is relatively small, involving only the parts from the motor shaft 32 to the actuator 39 and the socket 40. Moreover, the movements involved are of relatively small magnitude and the problem of lubrication and motive power required is thus reduced to a minimum. The reflector 25 and the stem carried by it are rigidly associated and move bodily within the yieldable element 27, no lubrication whatsoever being required in this part of the mechanism. The distortions to which the element 27 is subjected are extremely slight, and there is no likelihood of undue wear in this region.

Of primary importance is the fact that the entire mechanism is completely enclosed and shielded from the weather. The present device can be relied upon in all climates and at all temperatures. The housing need not be opened except for the possibility of having to replace the bulb 24. In such an event, it is a relatively simple matter to remove the lens 11 and to replace it after the desired change of bulbs has been effected. In any case, should the mechanism require repair or overhauling, it is a quite simple matter to remove the studs 20, whereupon the entire interior mechanism may be withdrawn forwardly from the housing body 10, as a single unit.

It will be understood that many of the details herein described and illustrated are of illustrative character, and that those skilled in the art may make changes in these details without necessarily departing from the spirit and scope of the invention as expressed in the appended claims.

Having thus described my invention and illustrated its use, what I claim as new and desire to secure by Letters Patent is:

1. In a mechanism of the character described, the combination of elements set forth in claim 3, said motive means comprising a drive shaft mounted behind said stem with its axis coincident with the axis of said conical twisting, an actuator carried on the end of said shaft, and a universal-joint articulation between said rear end of the stem and a point on said actuator eccentric with respect to said axis.

2. In a mechanism of the character described, the combination with the elements set forth in claim 4, of an electric motor in driving relation to said drive shaft, and a fixed frame supporting said motor, said frame having an apertured forwardly-positioned portion, said stem-supporting means comprising a yieldable element mounted within said aperture.

3. In a mechanism of the character described, an element provided with a rearwardly-directed stem, means for supporting said stem forwardly of its rear end, said means being yieldable only to an extent sufficient to permit a bodily conical twisting of said element and stem around an apex in the plane of said support, and motive means operatively connected to the rear end of said stem for moving said rear end through a circular arc, thereby causing rotative movement of that part of said element which lies forwardly of said support.

4. In a mechanism of the character described, an element provided with a rearwardly-directed stem, means for supporting said stem forwardly of its rear end, said means being yieldable only to an extent sufficient to permit a bodily conical twisting of said element and stem around an apex in the plane of said support, a drive shaft mounted behind said stem with its axis coincident with the axis of said conical twisting, and an eccentric articulation between said shaft and said rear end of the stem for moving said rear end through a circular arc, thereby causing rotative movement of that part of said element which lies forwardly of said support.

HARRY O. RICCI.

REFERENCES CITED

The following references are of record in the file of this patent:

UNITED STATES PATENTS

| Number | Name | Date |
| --- | --- | --- |
| 1,519,715 | Alforter | Dec. 16, 1924 |
| 2,122,008 | Marsters et al. | June 28, 1938 |
| 2,133,106 | Monroe | Oct. 11, 1938 |
| 2,221,483 | Kennelly | Nov. 12, 1940 |
| 2,262,239 | Kennelly | Nov. 11, 1941 |